United States Patent Office 3,477,813
Patented Nov. 11, 1969

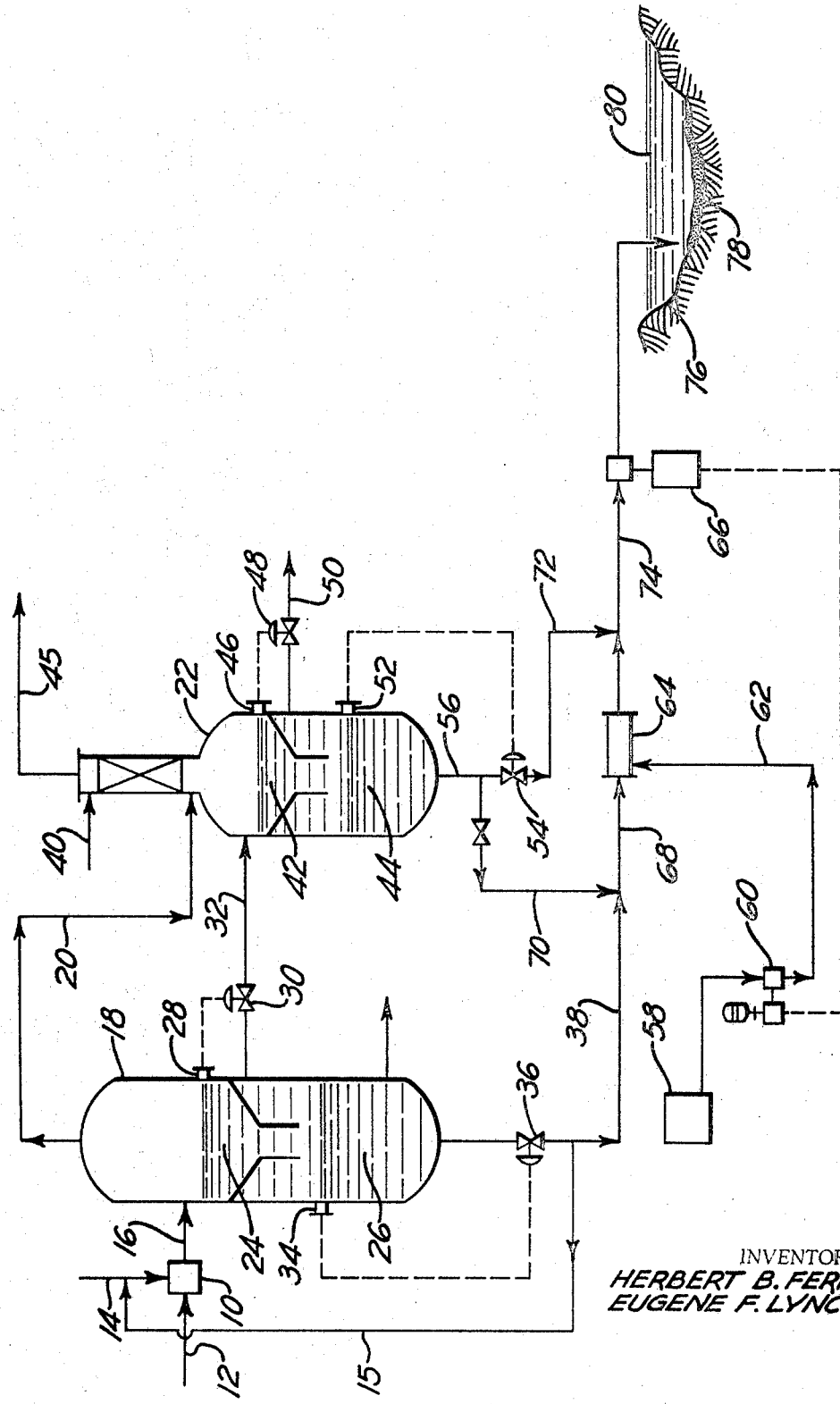

3,477,813
REMOVAL OF ALUMINUM FROM AN ALPHA OLEFIN PRODUCT STREAM
Herbert B. Fernald, Glenshaw, and Eugene F. Lynch, Oakmont, Pa., assignors to Gulf Research & Development Company, Pittsburgh, Pa., a corporation of Delaware
Filed June 22, 1967, Ser. No. 648,090
Int. Cl. C01f 7/36, 7/02
U.S. Cl. 23—143                                      12 Claims

ABSTRACT OF THE DISCLOSURE

When ethylene is polymerized to alpha olefins in the presence of an organo-aluminum catalyst, the aluminum catalyst is present in the normally liquid alpha olefin product and must be removed prior to distillation of said product. This removal is accomplished in two zones. Aqueous caustic solution is added to the alpha olefin product containing organo-aluminum catalyst to produce an organic phase and an aqueous phase in a first zone. Although water alone would have reacted with the catalytic aluminum to readily precipitate aluminum hydroxide, said aluminum hydroxide is insoluble in both phases and would deposit in the first zone chamber and in conduits associated therewith. The use of aqueous caustic prevents precipitation by forming sodium aluminate which is soluble in the aqueous phase. However, since some of the aqueous phase in the first zone emulsifies with the organic phase therein, some sodium aluminate together with caustic enters the organic phase with the emulsified water. This sodium aluminate and caustic is washed from the organic phase by means of water in a second zone. Aqueous effluent streams are then withdrawn from said first and second zones and if said streams are mixed the soluble aluminum in the mixed aqueous effluent streams can be precipitated as aluminum hydroxide in a zone remote from said first and second zones by the addition of acid thereto. However, the settling rate of aluminum hydroxide from said mixed effluent streams is very slow. A remarkable and unexpected increase in the settling rate of the aluminum hydroxide is realized by admixing only a minor proportion of the aqueous effluent stream from the second zone with the entire aqueous effluent stream from the first zone prior to the acid neutralization step and then adding the remainder of the aqueous effluent stream from the second zone to the neutralized stream.

---

Ethylene is polymerized to normal alpha olefins having between about 4 and 40 carbon atoms in the presence of an organo aluminum catalyst, such as triethyl aluminum, which is charged to the process in a catalyst solvent. The reaction temperature can be between about 180° and 240° C., the reaction pressure is at least about 1,000 pounds per square inch, there is between about $1\times10^{-4}$ and $1\times10^{-2}$ mols of catalyst per mol of ethylene, and the polymerization proceeds until there is a conversion of about 30 to 60 percent of said ethylene to polymer product. These process conditions are illustrative only and are not per se a part of the present invention. Further details of a suitable process for producing alpha olefins can be found in Ser. No. 608,127, filed Jan. 9, 1967.

In general, the product from the alpha olefin process, disregarding catalyst solvent, comprises between about 10 and 75 weight percent unreacted ethylene, the remainder being alpha olefin product and between about 0.2 to about 4 weight percent of organo aluminum catalyst having three alkyl groups with each group having an average of about 8 carbon atoms. For example, the product from the alpha olefin process commonly comprises about 49 or 50 weight percent unreacted ethylene, about 49 or 50 weight percent alpha olefin product and about 2 weight percent of organo aluminum catalyst. The product from the alpha olefin process is generally at a pressure between about 1500 and 4000 pounds per square inch or higher. It is important to substantially completely remove all the aluminum prior to charging the alpha olefin product to a distillation column for the fractionation thereof. Presence of aluminum under distillation conditions will seriously degrade the alpha olefin product and be generally deleterious to the distillation operation. This invention relates to a highly advantageous method for the removal of the aluminum from the product prior to charging said product to a distillation zone.

In accordance with this invention the aluminum is removed from the alpha olefin product in a continuous process employing two aluminum-separation zones. Just prior to the first aluminum-separation zone some ethylene gas is vented from the alpha olefin reactor effluent to reduce its pressure to between about 400 and 800 pounds per square inch and a mixture comprising unreacted ethylene, alpha olefin product, catalyst solvent and organo aluminum catalyst is passed through a mixing valve wherein it is mixed with make-up aqueous caustic solution containing between about 20 and 40 weight percent caustic. Because the volume of make-up caustic solution is very small compared to the volume of reactor effluent, in order to achieve good mixing and also to utilize unreacted caustic some process aqueous sodium aluminate solution is recycled so as to dilute the make-up caustic concentration to about 10 weight percent or lower. The concentration of the make-up caustic is important. If the concentration of the make-up caustic is less than about 15 weight percent, the excessive water introduced will prevent rapid settling of aluminum hydroxide later in the process. The effect of the addition of excessive water to the acid neutralization step upon the subsequent aluminum hydroxide settling rate is shown later in this application. If the concentration of the make-up caustic is more than about 40 or 50 percent, formation of solids might occur in the first zone because there will be insufficient water to completely dissolve water soluble salts which are present in the first zone. A pH of at least about 12.2 is required in the aqueous phase for aluminum to remain in solution as sodium aluminate and to obtain this pH it is advantageous for the total amount of sodium hydroxide added to be at least about 1 weight percent above the amount stoichiometrically required, generally, and at least about 2 weight percent above the amount stoichiometrically required, preferably.

In the first aluminum-separation zone, separate organic and aqueous layers form. The aqueous layer comprises a water solution of sodium aluminate, $Na_2OAl_2O_3$, together with a small amount of excess sodium hydroxide. Gaseous ethylene is vented from the first zone so that the organic layer comprises the liquid alpha olefin product together with some emulsified water in which is dissolved sodium aluminate plus free sodium hydroxide. The concentration of the sodium aluminate and sodium hydroxide in the emulsified water is the same as the concentration thereof in the water layer. The sodium aluminate plus sodium hydroxide content of the organic phase is broadly about 10 to 500 parts per million, and more narrowly about 50 to 300 parts per million. Since it is necessary to accomplish complete removal of the sodium aluminate and free sodium hydroxide from the organic phase prior to charging said phase to a distillation zone, the alpha olefin organic phase is decanted from the water phase and is charged to a second aluminum-separation zone.

In the second aluminum-separation zone a relatively large volume of wash water is passed through the alpha olefin organic phase to wash substantially all the sodium aluminate and sodium hydroxide from said organic phase or at least to produce an organic phase which is relatively free of sodium aluminate and sodium hydroxide. The volume of water added to the second zone is between about 3 and 50, generally, or between about 5 and 40, preferably, times the amount of water added to the first separation zone with the caustic. An aqueous phase containing washed sodium aluminate and sodium hydroxide settles out of the organic phase in the second separation zone. The organic phase, which is substantially free of sodium aluminate and sodium hydroxide, is then charged to a product distillation zone while the aqueous phase containing washed sodium aluminate and sodium hydroxide is removed from the bottom of the second separator.

The aqueous phase removed from the bottom of the first separation zone contains a relatively small volume of highly concentrated sodium aluminate and some sodium hydroxide. It is noted that this concentrated sodium aluminate solution would constitute an excellent material for the preparation of a catalyst because it is of high purity having been derived from a completely organic rather than an inorganic source. Sodium aluminates derived from inorganic sources, such as bauxite, are commonly contaminated with foreign metals. The aqueous phase removed from the bottom of the second zone comprises a relatively large volume of very dilute sodium aluminate and sodium hydroxide. The ratio of sodium aluminate to sodium hydroxide in the aqueous effluents from each zone is about the same. In order for the aqueous effluent removed from each zone to be discharged to a public waterway it is necessary to partially or completely neutralize said effluents and remove the dissolved aluminum therefrom. Neutralization of said aqueous streams and precipitation of the aluminum contained therein is accomplished by reaction of said streams with an acid, preferably aqueous sulfuric acid. Other acids can be employed, such as, for example, phosphoric, nitric, hydrochloric, acetic, etc. The aqueous sulfuric acid is preferably added in a quantity which substantially neutralizes said streams to a pH of 7. As stated above, in order for the aluminum to remain soluble as sodium aluminate the pH of the aqueous streams must be at least about 12.2 and this is the reason excess caustic was added in the first zone. Conversely, the addition of only enough acid to reduce the pH below about 12 will cause aluminum hydroxide to be precipitated. However, it is preferable that sufficient acid be added to reduce the pH below about 8 because at this pH level the solubility of aluminum hydroxide in water is about a minimum. After neutralization and precipitation of aluminum hydroxide, an aqueous solution containing soluble sodium sulfate which is partially or completely neutralized is discharged to a public waterway.

In accordance with the present invention, we have discovered that the rate of settling of aluminum hydroxide from the aqueous sodium aluminate effluent streams from said first and second zones is unexpectedly greatly increased by mixing said aqueous streams with the acid and with each other in the particular sequence described herein. Each step of the mixing sequence of this invention is critical. The mixing sequence of the present invention comprises separating a stream comprising a minor proportion of the dilute aqueous effluent from the second zone, and blending said stream with the total aqueous effluent from the first zone and then passing the resulting blended stream through an acid mixing chamber to which an acid such as concentrated sulfuric acid is added in a quantity to neutralize said blended stream to a pH of 12 or lower, generally, of a pH of 8 or lower, preferably, and finally adding the remainder of the dilute aqueous effluent from said second zone to said neutralized stream.

Since the second zone aqueous effluent is dilute, its addition to the neutralized blended stream will not have an appreciable effect upon the pH thereof. The finally mixed stream containing the total aqueous effluents from the first zone and the second zone in admixture with sufficient acid to substantially completely precipitate the aluminum as aluminum hydroxide therefrom is passed to a large settling lagoon wherein aluminum hydroxide rapidly settles to the bottom and a clear aqueous layer is removed by decantation for discharge to a public waterway.

Of the aqueous effluent from the second zone, less than one half the volume thereof, generally, or as little as about one per cent of the volume thereof, depending on the volumetric ratio of the aqueous effluents from the first and second zones, is admixed with the aqueous stream from the first zone prior to neutralization.

We have found that the pre-admixture of the entire aqueous effluents from the first and second zones prior to neutralization with acid results in a very slow rate of settling of aluminum hydroxide following neutralization. On the other hand, we have found that neutralization of the aqueous effluent from the first zone alone without pre-admixture with any of the aqueous effluent from the second zone is not a feasible operation because the addition of the acid to the concentrated aqueous effluent from the first zone alone produces a very thick mass which is difficult to handle. This problem is particularly acute when the acid employed is sulfuric acid. Evidently, the aqueous effluent from the first zone is so concentrated that when sulfuric acid is the acid used a sodium aluminum sulfate alum is formed which consumes substantially all of the relatively small amount of water present as water of hydration and solidifies into a solid crystal mass. In order to dissolve said crystal mass the amount of water present must be considerably greater than that stoichiometrically required to form the hydrated solid alum crystal mass whereby said crystal mass dissolves therein. We have found that the partitioning of the aqueous effluent stream from the second zone to blend a minor proportion thereof with the total effluent from the first zone followed by neutralization of said blended mixture and subsequently charging the remaining and major portion of the aqueous effluent from the second zone to the neutralized stream results in a highly fluid stream in the acid neutralization zone plus a much higher rate of aluminum hydroxide settling than would be possible if the total aqueous effluent streams from said first and second zones were intermixed prior to neutralization with sulfuric acid.

It is a highly surprising feature of this invention that an improvement in aluminum hydroxide settling rate is accomplished by partitioning the aqueous effluent stream from the second zone. The normal mode of neutralization of separate streams is to completely admix said streams prior to neutralization, but in accordance with the present invention we have found that the subsequent settling rate of aluminum hydroxide can be greatly increased by deviating from this normal mode of operation. We have unexpectedly found that the rate of settling of the aluminum hydroxide is remarkably improved by withholding a major proportion of the aqueous effluent from the second zone from the acid mixer and only adding said major proportion after neutralization of all the rest of the aqueous effluent with acid has first occurred. It is an important feature of this invention that the major portion of the aqueous effluent from the second zone cannot be disregarded even though its addition is delayed because it has been found that if it is not added following the neutralization step the aluminum hydroxide settling rate is seriously retarded. The reason may be that in the absence of the major portion of the aqueous effluent from the second zone the concentration of electrolytes in the aluminum hydroxide settling zone is so high that a stable sol tends to exist, which impedes settling. However, the addition of said major portion of effluent dilutes the concentration of electrolytes sufficiently to prevent a stable sol from developing.

There is a high degree of interdependence between all the elements of the process of this invention. For example, the problem of rate of settling of aluminum hydroxide which is treated in accordance with this invention only arises because aqueous sodium hydroxide solution rather than plain water is reacted with the stream charged to the first aluminum-removal zone. The organo-aluminum catalyst could have been easily removed in the first zone merely by adding plain water to said first zone which would react with the organo-aluminum catalyst causing aluminum hydroxide to precipitate substantially completely from both the organic phase and the aqueous phase in said first zone. However, we have found that the precipitation of aluminum hydroxide in the first zone causes a build up of solid material upon the walls of said zone and in transfer lines and instrument lines, etc., and it is therefore more convenient to maintain the aluminum in solution in the aqueous phase until said aqueous phase is removed from the first zone. It is for this reason that aqueous sodium hydroxide solution rather than water is charged to the first zone. The aqueous sodium hydroxide reacts with the organo-aluminum catalyst to produce soluble sodium aluminate rather than insoluble aluminum hydroxide. The formation of soluble sodium aluminate requires a pH of at least about 12.2 in the aqueous phase and this pH is achieved in the presence of at least about 2 weight per cent of stoichiometrically excess sodium hydroxide. It is important that at least about 2 percent excess sodium hydroxide be added to the first zone because it was found that if only about 1 percent excess sodium hydroxide is added to the first zone the pH is not sufficiently high to keep all the aluminum in solution and solid deposit formation occurs on the walls of the first zone chamber.

Because the sodium hydroxide solubilizes the aluminum in the water phase it is unfortunately the cause of some aluminum re-entering the organic phase. The presence of water in the alpha olefin system results in some emulsification of water in oil. Since the water contains soluble sodium aluminate and at least about 2 weight percent excess sodium hydroxide both of these materials will be present in the water phase of the water in oil emulsion in exactly the same ratio and concentration that they are present in the aqueous layer of the first zone. Therefore, the organic effluent from the first zone comprises broadly about 10 to about 500 parts per million of sodium aluminate plus caustic all of which is contained in the water phase thereof, and narrowly about 50 to 300 parts per million.

The use of aqueous sodium hydroxide in the first aluminum-removal zone rather than water alone necessitates the use of a second aluminum-removal zone in the process of this invention in order to remove sodium aluminate and caustic from the alpha olefin phase. The use of sodium hydroxide in the first zone also necessitates the presence of an external aluminum hydroxide precipitation zone. If the sodium hydroxide did not solubilize the aluminum which would have tended to precipitate completely in the first zone in the presence of water, substantially no aluminum would have entered the water phase of the water in oil emulsion and the second aluminum-removal zone would not have been required. However, since the second aluminum removal zone is required, the present invention advantageously employs the aqueous effluent from the second aluminum-removal zone in conjunction with the neutralization step to increase the rate of precipitation of aluminum hydroxide. Therefore, the second aluminum-removal step and the neutralization step cooperate in a highly interdependent manner in accordance with the present invention to produce very rapid settling of aluminum hydroxide and both of these steps were necessitated only because of the use of sodium hydroxide in the first aluminum-removal zone to keep the aluminum in solution. There is clearly great interdependence between the first aluminum-recovery step, the second aluminum-recovery step and the neutralization step in the method of the present invention.

The operation of the process of this invention will be more completely understood by the following example set forth in reference to the accompanying drawing. Referring to the drawing, 10 represents a mixing valve to which effluent from the alpha olefin process is charged through line 12 and aqueous 20 to 40 weight percent make-up sodium hydroxide solution is introduced through line 14. Recycle aqueous sodium aluminate solution is introduced to line 14 through line 15. The alpha olefin process effluent stream charged through line 12 is under a pressure of about 600 pounds per square inch gauge and contains about 49 percent alpha olefin product, about 49 percent unreacted ethylene and about 2 percent of organo aluminum catalyst. The discharge from mixer 10 is under a pressure of about 220 pounds per square inch and passes through line 16 to a first aluminum-removal chamber 18. Gaseous ethylene under a pressure of about 220 pounds per square inch passes overhead through line 20 to a second aluminum-removal chamber 22. A small amount of other organic vapors such as butene and hexene is intermixed with the ethylene. In chamber 18 an organic layer 24 overlies an aqueous layer 26. Aqueous layer 26 contains soluble sodium aluminate plus about 2 weight percent excess sodium hydroxide. Organic layer 24 contains alpha olefins together with about 50 to 300 parts per million of sodium aluminate and caustic dissolved in emulsified water. A constant organic phase level is maintained in chamber 18 by means of level controller 28 and level control valve 30 which discharges alpha olefins containing dissolved water, sodium aluminate and caustic to chamber 22 through line 32. A constant water phase level is maintained in chamber 18 by means of level controller 34 and control valve 36 which discharges aqueous sodium aluminate and 2 weight percent excess caustic through line 38.

Water is added to chamber 22 through line 40 to wash the sodium aluminate and caustic out of organic phase 42 into aqueous phase 44. Ethylene and other gases are removed from the top of chamber 22 at a pressure of about 170 pounds per square inch and recycled to the alpha olefin process through line 45. The volume of water added through line 40 is about 30 times greater than the volume of water added to the first chamber with the caustic through line 14. A constant organic phase level is maintained in chamber 22 by means of level controller 46 and control valve 48 which discharges an alpha olefin stream which is essentially free of sodium aluminate and caustic through line 50 to a distillation zone, not shown. A constant aqueous phase level is maintained in chamber 22 by means of level controller 52 and control valve 54 which permits the discharge of an aqueous stream containing sodium aluminate and sodium hydroxide through line 56.

Concentrated sulfuric acid is stored in a container 58 from which it is pumped by means of pump 60 through line 62 to mixing valve 64. Sulfuric acid pump 60 is controlled by means of a pH recorder controller 66. Aqueous effluent from chamber 18 containing concentrated sodium aluminate and some sodium hydroxide is charged to sulfuric acid mixing valve 64 through lines 38 and 68. A portion of the aqueous effluent from water chamber 22 which is about equal to the volume flowing through line 38 is charged to line 68 through line 70 so that line 68 contains an approximately equal volumetric admixture of streams from lines 38 and 70. Of the volume of aqueous effluent flowing through line 56, only about one-thirtieth is diverted through line 70 while the remainder passes through line 72 to the neutralized effluent from sulfuric acid mixing valve 64 and is mixed therewith in line 74. Line 74 therefore contains the total aqueous effluent from chambers 18 and 22 plus the sulfuric acid neutralizing agent. Line 74 discharges this total stream to a lagoon 76. In lagoon 76 aluminum hydroxide precipitate settles to bottom layer 78 while a clear liquor containing dissolved sodium sulfate accumulates overhead at 80 and is decanted from the lagoon to a public waterway, not shown.

The following table shows details of tests made to illustrate the improved aluminum hydroxide settling rates of the present invention. Since the aqueous effluent from the second aluminum-removal chamber is extremely dilute, for convenience in making the tests certain of the tests utilized water as an equivalent to the aqueous effluent from said chamber. In a large number of tests made relative to the present invention to determine aluminum hydroxide settling rates it was found that the effect of water upon the settling rate is in fact equivalent to the effect of the dilute aqueous effluent from the second aluminum-removal chamber.

| Test | Method | Neutralized pH | Comments regarding settling of Aluminum Hydroxide |
| --- | --- | --- | --- |
| 1 | Total aqueous effluent stream from the first aluminum-removal zone and the total aqueous effluent stream from the second aluminum-removal zone (volume ratio of these streams is about 1:30) are blended prior to neutralization with $H_2SO_4$. | 7.15 | First noticeable settling in 20 minutes; 5 volume percent clear liquid after 2 hours; 30 volume percent clear liquid overnight. |
| 2 | A blend of the total aqueous effluent from the first aluminum-removal zone and the total aqueous effluent stream from the second aluminum-removal zone (volume ratio of these streams is about 1:30) is diluted with 4 times the combined stream volume of water prior to neutralization with $H_2SO_4$. | 6.92 | First noticeable settling in 4 minutes; 45 volume percent clear liquid after 1 hour; 70 volume percent clear liquid overnight. |
| 3 | The total aqueous effluent stream from the first aluminum-removal zone is neutralized with $H_2SO_4$. (The aqueous effluent stream from the second aluminum-removal zone is omitted entirely from this test.) | 7.15 | Large amount of precipitate which is difficult to stir; large evolution of heat with no apparent settling. |
| 4 | 250 ml. of the aqueous effluent stream from the first aluminum-removal zone is mixed with 250 ml. of water. The mixture is neutralized with $H_2SO_4$ to a pH of 8.4. (No additional liquid is added.) | 8.4 | There is 36 volume percent clear liquid overnight. |
| 5 | 100 ml. of the aqueous effluent stream from the first aluminum-removal zone is mixed with 100 ml. of water. The mixture is neutralized with $H_2SO_4$ to a pH of 9.9. 3000 ml. of water is added to the neutralized mixture prior to settling. After a period of settling the mixture is restirred and more $H_2SO_4$ is added to reduce the pH to 7. | 9.9; 7 | In the first period of settling 80 volume percent of clear liquid is formed in 5 minutes. After restirring there is: 80 volume percent of clear liquid in 5 minutes; 88 volume percent of clear liquid in 3 days. |

Tests 1 to 4 represent processes inferior to the process of this invention. Test 1 shows that when the combined aqueous streams from the first aluminum-removal zone and the second aluminum-removal zone (there are normally about 30 volumes of aqueous effluent from the second zone for each volume of aqueous effluent from the first zone) are neutralized there is only 5 volume percent of clear liquid after 2 hours of settling time. Test 2 shows that when the combined aqueous effluent streams from the first and second zones are diluted with 4 times their volume of water and then neutralized, there is 45 percent clear liquid after 1 hour of settling. Test 3 shows that when an undiluted aqueous effluent stream from the first aluminum-removal zone is neutralized, there is no apparent settling. Test 4 shows that when equal volumes of the aqueous effluent from the first and second zones are blended prior to neutralization, but the remainder of the aqueous effluent from the second zone is not charged to the settling zone, there is 36 volume percent clear liquid after overnight settling.

Test 5 represents the process of this invention. In Test 5, 1 volume of aqueous effluent from the first zone is mixed with 1 volume of water (equivalent to about one-thirtieth of the normal volume of aqueous effluent from the second zone) and the admixture is then neutralized, followed by dilution with an amount of water equivalent to about the total volume of the aqueous effluent from the second zone. 80 volume percent clear liquid is achieved in 5 minutes. Neutralizing further does not appear to change the settling rate. The aluminum hydroxide settling rate of Test 5 is far superior to the aluminum hydroxide settling rates of Tests 1 to 4.

We claim:
1. A process for the removal of aluminum from the product stream of an alpha olefin process wherein ethylene is polymerized to alpha olefins in the presence of an organo-aluminum catalyst to produce a product stream containing said organo-aluminum catalyst in the alpha olefins comprising mixing an aqueous caustic solution containing a stoichiometric excess of caustic and having a caustic concentration of at least about 15 weight percent with said product stream to produce in a first aluminum-removal zone an aqueous phase containing dissolved sodium aluminate and caustic and an alpha olefin phase containing emulsified water in which is dissolved sodium aluminate and caustic, charging said alpha olefin phase to a second aluminum-removal zone and adding water to wash said alpha olefin phase and produce in said second aluminum-removal zone an aqueous phase containing sodium aluminate and caustic and an alpha olefin phase which is relatively free of sodium aluminate and caustic, the aqueous phase effluent from said second zone comprising a greater volume than the aqueous effluent from said first zone, partitioning a minor proportion of the aqueous stream effluent from said second zone and admixing it with substantially the total aqueous stream effluent from said first zone to produce an admixed stream, charging acid to said admixed stream to at least partially neutralize said admixed stream and precipitate aluminum hydroxide, charging the remaining aqueous effluent from said second zone to the admixed stream after neutralization thereof to produce a final stream, and charging said final stream to an aluminum hydroxide settling zone.

2. The process of claim 1 wherein the pH of the aqueous phase in said first zone is at least about 12.2.

3. The process of claim 1 wherein at least about 2 weight percent excess sodium hydroxide above the amount stoichiometrically required is employed.

4. The process of claim 1 wherein said caustic concentration is between about 20 and 40 weight percent.

5. The process of claim 1 wherein the alpha olefin phase charged to said second zone contains between about 10 to 500 parts per million of sodium aluminate and caustic.

6. The process of claim 1 wherein said acid is sulfuric acid.

7. The process of claim 1 wherein sufficient acid is added to reduce the pH to at least about 12.

8. The process of claim 1 wherein sufficient acid is added to reduce the pH to a level near 8.

9. The process of claim 1 wherein the volume of the aqueous effluent from said second zone is between about 3 and 50 times the volume of aqueous effluent from said first zone.

10. The process of claim 1 wherein said minor proportion of aqueous effluent from said second zone is less than about one-half the volume of the total aqueous effluent from said second zone and more than about one percent of the volume of the total aqueous effluent from said second zone.

11. The process of claim 1 wherein said acid is sulfuric acid and said minor proportion of aqueous effluent from said second zone is of sufficient volume to prevent the solid crystal formation of alum in said neutralization step.

12. A process for the removal of aluminum from the product stream of an alpha olefin process wherein ethylene is polymerized to alpha olefins in the presence of an organo-aluminum catalyst to produce a product stream containing said organo-aluminum catalyst in the alpha olefins comprising mixing an aqueous caustic solution containing about 2 weight percent stoichiometric excess of caustic and having a caustic concentration between about 20 and 40 weight percent with said product stream to produce in a first aluminum removal zone an aqueous phase containing dissolved sodium aluminate and caustic and an alpha olefin phase containing emulsified water in which is dissolved sodium aluminate and caustic, charging said alpha olefin phase to a second aluminum-removal zone and adding water to wash said alpha olefin phase and produce in said second aluminum-removal zone an aqueous phase containing sodium aluminate and caustic and an alpha olefin phase which is relatively free of sodium aluminate and caustic, the aqueous phase effluent from said second zone comprising between about 3 and 50 times the volume of aqueous effluent from said first zone, partitioning a minor proportion of the aqueous effluent from said second zone and admixing it with substantially the total aqueous stream effluent from said first zone to produce an admixed stream, charging sulfuric acid to said admixed stream to at least partially neutralize said admixed stream and precipitate aluminum hydroxide, charging the remaining aqueous effluent from said second zone to the admixed stream after neutralization thereof to produce a final stream, and charging said final stream to an aluminum hydroxide settling zone.

References Cited

UNITED STATES PATENTS 3,278,262   10/1966   Poe et al. _____ 23—143

OSCAR R. VERTIZ, Primary Examiner

G. T. OZAKI, Assistant Examiner

U.S. Cl. X.R.
23—52; 260—677